No. 804,038. PATENTED NOV. 7, 1905.
G. N. PIFER.
PHOTOGRAPHIC PROCESS AND PRODUCT.
APPLICATION FILED APR. 12, 1905.
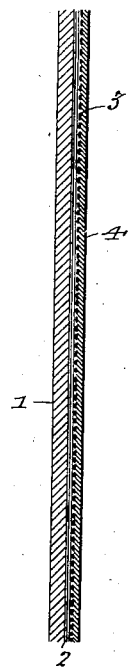
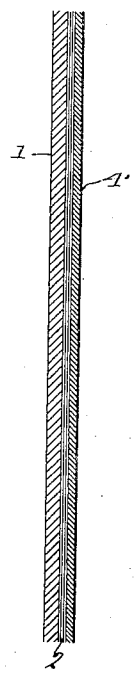
Witnesses:
Inventor:
George N. Pifer,
by his Attorneys,

UNITED STATES PATENT OFFICE.

GEORGE N. PIFER, OF CLEVELAND, OHIO.

PHOTOGRAPHIC PROCESS AND PRODUCT.

No. 804,038.      Specification of Letters Patent.      Patented Nov. 7, 1905.

Application filed April 12, 1905. Serial No. 255,214.

To all whom it may concern:

Be it known that I, GEORGE N. PIFER, a citizen of the United States, and a resident of Cleveland, Ohio, have invented certain Improvements in Photographic Processes and Products, of which the following is a specification.

The object of my invention is to produce by direct exposure in the camera and by a relatively simple process a picture which is a true positive of the subject both as to shading and position, an object which I attain in the following manner:

To any suitable transparent or partially transparent body—such as a sheet of glass, celluloid, transparent paper, or the like—I apply a coating of a material which is relatively opaque when viewed by reflected light, yet partially transparent to transmitted light, and which is of a color desired for the high lights of the finished picture. If desired, what is commonly termed "flashed glass" or "translucent celluloid" can be used, or for the usual black-and-white picture I may use a compound of barium sulfate or oxid of zinc and gelatin of such a consistency as will present a proper degree of opacity when viewed by reflected light and yet will remain partially transparent to transmitted light. The coating thus produced is then sensitized in any available way, and the sensitive film is exposed in the camera so that the light-rays from the object will pass through the relatively transparent body and its relatively transparent coating instead of falling directly upon the sensitized film, thus reversing the usual method of exposure. The image is then developed in the usual way and now presents a picture which is half negative and half positive—that is to say, it is a negative as regards light and shade, but is a positive as regards the position of the object photographed.

By exposing a sensitized film so that the light-rays first strike the back or inner face of the film the reduction of the sensitive salt in the lights of the picture will in case of an unequal reduction throughout the thickness of the film be greatest at said inner face, and as the development begins at the opposite or outer face of the film an appearance of full development in the lights of the picture will assure the operator that development has extended completely through the film and has reached those portions of the same in which the sensitive salt has the greatest amount of reduction, whereas when the light-rays have acted first upon the outer face of the film an appearance of full development may be obtained even if the reduction and development has not extended completely through the film and unreduced or only partially reduced salts are present at the back or inner face of the film.

Exposure of the film through its transparent base or cover is therefore an important factor in the production of a positive picture by direct exposure in the camera, because in the after treatment of the picture for the removal of the reduced silver salt it is important that all of said salt should be removed from the high lights of the picture in order to prevent the darkening of the latter by the subsequent treatment.

The negative quality of the picture as to light and shade can now be reversed into a positive quality by any of the methods usually practiced to attain that result—for instance, the developed portions of the image may be removed with acids which will not affect the unaltered portions, the latter being again exposed to actinic light and the plate or film redeveloped after such second exposure. I prefer, however, to remove the developed portions of the image after the first exposure by subjecting them to the action of an acid—for instance, sulfuric or nitric acid—with or without an oxidizing agent, such as permanganate of potash; but I omit the second exposure to light and the subsequent development and change the unaltered portions of the film to a different color or shade by a direct and almost instantaneous method. By thus omitting the second exposure I am enabled to dispense with the use of some uniform or artificial light, which would be inconvenient in many cases—for instance, in automatic photograph-machines.

If the backing of the sensitive film is such as to appear white or of a light color when viewed by reflected light and the unreduced silver salt is of corresponding color, no proper effect of light and shade would be produced, since the white backing would be clearly visible through those portions of the sensitized film from which the silver salt had been removed by the acid or reduction treatment.

If it is desired to change the color of the unreduced silver salt from white to black, I prefer to effect this result by transforming the bromid of silver or other silver salt in the film to sulfid of silver, which darkens it instantly. This result can be readily effected by subjecting the sensitive film to the action of a bath consisting of a solution in water of potassium sulfid or ammonium sulfid. The treatment may be varied, however, depending upon the color to which it is desired to transform the unreduced silver salt of the sensitive film and the color which is presented by the backing of the film when viewed by reflected light. For instance, treatment with a bath of potassium sulfid alone results in a yellowish or sepia tone, while if ammonium sulfid or sulfid of soda is added a brownish tone is produced, and sulfid of soda alone produces a black and white effect. Any of the usual photographic tones can thus be produced by this sulfid-of-silver process, which is a distinct advantage over the usual method of redeveloping the image by regular development.

My process is a relatively simple one, since it involves the use of but three successive baths without the necessity of reëxposing to light the sensitive film at any stage of the process following the original exposure, and yet I can produce an image positive as to light and shade and also as to position.

In some cases I may interpose a fine-line screen in the primary coating—that is to say, the one which is applied to the transparent plate and which receives the sensitive film— the object of such screen being to render unnecessary any retouching of the picture.

In the accompanying drawings, Figure 1 shows an exaggerated section of one form of photographic plate or film made according to my invention, and Fig. 2 is a similar view of another form of the same.

1 represents the glass or other transparent plate or film; 2, the primary coating, opaque when viewed by reflected light, but transparent to transmitted light; 3, the fine-line screen, and 4 the sensitive coating.

Having thus described my invention, I claim and desire to secure by Letters Patent—

1. The mode herein described of producing a true positive picture by direct exposure in the camera, said mode consisting in first exposing the sensitized plate to the rays of light from the object by causing said rays to pass first through the relatively transparent base carrying the sensitive film, and then developing the image as a positive, substantially as specified.

2. The mode herein described of producing, by direct exposure in the camera, a true positive picture, said mode consisting in first applying a sensitive coating to a base which is relatively transparent to transmitted light but opaque when viewed by reflected light, then exposing said sensitive film in the camera in such a manner that the rays of light from the object pass first through the relatively transparent base and then developing as a positive the image thus produced, substantially as specified.

3. The mode herein described of producing a true positive picture by direct exposure in the camera, said mode consisting in first providing a relatively transparent base with a primary coating which is relatively transparent to transmitted light but opaque when viewed by reflected light, then applying a sensitive coating to said primary coating, then exposing the sensitized plate or film in the camera in such a manner that the rays of light from the object pass first through the relatively transparent plate, and then through the primary coating, and then developing as a positive the image thus produced, substantially as specified.

4. The mode herein described of producing, by direct exposure in the camera, a picture which is a positive as regards light and shade, said mode consisting in first exposing the sensitized plate or film in the camera to the rays of light from the object, then developing the picture as a negative, then removing those portions of the picture which have been acted upon by light, and then subjecting the unreduced portions of the sensitive salt to treatment other than exposure to light, which will change the color of the same, substantially as specified.

5. The mode herein described of producing, by direct exposure in the camera, a picture which is positive as to its light and shade, said mode consisting in exposing the sensitive film or plate in the camera to the rays of light from the object, then developing the picture as a negative, then removing those portions of the picture which have been acted upon by the rays of light, and then transforming the unreduced sensitive salt to a sulfid, substantially as specified.

6. The mode herein described of producing, by direct exposure in the camera, a picture which is positive both as to position and light and shade, said mode consisting in first applying the sensitive film to a base which is relatively transparent to transmitted light but opaque when viewed by reflected light, exposing said sensitive film in the camera in such manner that the rays of light from the object will pass first through the base, then developing the picture thus produced as a negative, then removing those portions of the picture which have been acted upon by the light, and then changing the color of the unreduced portions of the sensitive salt, substantially as specified.

7. The mode herein described of producing, by direct exposure in the camera, a picture which is positive both as to position and light and shade, said mode consisting in first applying a sensitive film to a base which is relatively transparent to transmitted light but opaque when viewed by reflected light, then exposing said sensitized film in the camera in such manner that the rays of light from the object pass first through the base, then developing the film as a negative, then removing those portions of the picture which have been acted upon by the light, and then transforming to a sulfid those portions of the sensitive film which have not been reduced by exposure to the light, substantially as specified.

8. The mode herein described of producing a positive picture by direct exposure in the camera, said mode consisting in preparing a sensitive film with a line-screen in the rear of the same, exposing said film in the camera in such manner that the rays of light from the object pass first through the line-screen, and then developing the image as a positive, substantially as specified.

9. The mode herein described of producing a positive picture by direct exposure in the camera, said mode consisting in preparing a sensitive film with a line-screen in the rear of the same, exposing said film in the camera in such manner that the rays of light from the object pass first through the line-screen, then developing the image as a negative, then removing those portions of the image which have been acted upon by the light, and then changing the color of the unreduced portions of the sensitive salt, substantially as specified.

10. The mode herein described of producing a positive picture by direct exposure in the camera, said mode consisting in preparing a sensitive film with a line-screen in the rear of the same, exposing said film in the camera in such manner that the rays of light from the object pass first through the line-screen, then developing the image as a negative, then removing those portions of the image which have been acted upon by the light, and then transforming to a sulfid those portions of the sensitive salt which have not been reduced by exposure to the light, substantially as specified.

11. A photographic picture which is positive as to position and light and shade of the subject, and consists of an exposed and developed film, a relatively transparent support therefor, and an interposed film which is relatively transparent to transmitted light but opaque when viewed by reflected light, substantially as specified.

12. A photographic picture which is positive as to position and light and shade of the subject, and consists of an exposed and developed film with a line-screen in the rear of the same, substantially as specified.

13. A photographic picture which is positive as to position and light and shade of the subject, and consists of an exposed and developed film, having a base containing as an element a line-screen, substantially as specified.

14. A photographic picture which is positive as to position and light and shade of the subject, and consists of an exposed and developed film, having a base which is relatively transparent to transmitted light but opaque when viewed by reflected light, and has as an element a line-screen, substantially as specified.

In testimony whereof I have signed my name to this specification in the presence of two subscribing witnesses.

GEORGE N. PIFER.

Witnesses:
W. S. SNYDER,
E. L. BRAINARD.